United States Patent
Sun et al.

(10) Patent No.: US 12,028,813 B2
(45) Date of Patent: Jul. 2, 2024

(54) DYNAMIC POWER REDUCTION REQUESTS FOR WIRELESS COMMUNICATIONS

(71) Applicant: Apple Inc., Cupertino, CA (US)

(72) Inventors: Yakun Sun, San Jose, CA (US); Anatoliy S. Ioffe, Sunnyvale, CA (US); Ehsan Haghani, Redwood City, CA (US); Rohit U. Nabar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 171 days.

(21) Appl. No.: 17/720,028

(22) Filed: Apr. 13, 2022

(65) Prior Publication Data

US 2022/0248337 A1   Aug. 4, 2022

Related U.S. Application Data

(63) Continuation of application No. 17/175,294, filed on Feb. 12, 2021, now Pat. No. 11,310,748, which is a continuation of application No. 16/671,910, filed on Nov. 1, 2019, now Pat. No. 10,925,007.

(60) Provisional application No. 62/910,849, filed on Oct. 4, 2019, provisional application No. 62/755,199, filed on Nov. 2, 2018.

(51) Int. Cl.
*H04W 72/51* (2023.01)
*H04W 52/14* (2009.01)
*H04W 52/36* (2009.01)
*H04W 72/044* (2023.01)
(Continued)

(52) U.S. Cl.
CPC ....... *H04W 52/146* (2013.01); *H04W 52/365* (2013.01); *H04W 72/0473* (2013.01); *H04W 72/51* (2023.01); *H04W 76/10* (2018.02); *H04W 76/27* (2018.02)

(58) Field of Classification Search
CPC . H04W 52/146; H04W 52/365; H04W 76/27; H04W 76/10; H04W 72/51; H04W 72/0473
See application file for complete search history.

(56) References Cited

U.S. PATENT DOCUMENTS 5,070,832 A * 12/1991 Hapka .................. F02D 17/04
123/333
5,884,170 A * 3/1999 Valentine .............. H04W 68/02
455/433

(Continued)

FOREIGN PATENT DOCUMENTS

| EP | 3528364 A1 * | 8/2019 | .............. H02J 50/10 |
| WO | WO-2015136866 A1 * | 9/2015 | ........... H04L 5/0055 |
| WO | WO-2016178760 A1 * | 11/2016 | ............ H04W 28/06 |

*Primary Examiner* — Hai V Nguyen
(74) *Attorney, Agent, or Firm* — FLETCHER YODER P.C.

(57) ABSTRACT

Methods and systems for controlling uplink (UL) transmission power of a user equipment (UE) electronic device includes determining, using the UE electronic device, that a maximum power availability for a transmission between the UE and a wireless network node is not appropriate to current conditions. Based on the determination that maximum power availability is not appropriate the UE electronic device sends a request to the wireless network node to reduce power for communication with the wireless network node. Based on the request, the UE electronic device communicates at a reduced power level for communications with the wireless network node.

20 Claims, 9 Drawing Sheets

(51) Int. Cl.
*H04W 76/10* (2018.01)
*H04W 76/27* (2018.01)

(56) References Cited

U.S. PATENT DOCUMENTS

| | | | |
|---|---|---|---|
| 6,760,311 B1 | 7/2004 | Raith | |
| 7,570,627 B2* | 8/2009 | Welborn | H04W 52/367 |
| | | | 370/347 |
| 7,860,018 B2 | 12/2010 | Raith | |
| 8,009,658 B2* | 8/2011 | Welborn | H04B 1/7176 |
| | | | 370/347 |
| 8,150,446 B2 | 4/2012 | Huan | |
| 8,280,429 B2 | 10/2012 | Huan | |
| 8,315,661 B2* | 11/2012 | Zong | H04W 52/367 |
| | | | 455/226.1 |
| 8,433,359 B2 | 4/2013 | Yang et al. | |
| 8,537,767 B2* | 9/2013 | Zhang | H04W 52/365 |
| | | | 37/468 |
| 8,687,566 B2* | 4/2014 | Maas | H04L 1/0015 |
| | | | 370/329 |
| 8,811,322 B2 | 8/2014 | Feuersanger et al. | |
| 9,019,880 B2* | 4/2015 | Ehsan | H04W 52/325 |
| | | | 455/450 |
| 9,036,585 B2* | 5/2015 | Heo | H04W 52/365 |
| | | | 370/329 |
| 9,113,428 B2* | 8/2015 | Vujcic | H04L 5/0098 |
| 9,113,474 B2 | 8/2015 | Kim | |
| 9,185,666 B2* | 11/2015 | Ho | H04W 52/365 |
| 9,210,671 B2 | 12/2015 | Boström et al. | |
| 9,215,686 B2* | 12/2015 | Kazmi | H04B 17/27 |
| 9,225,493 B2 | 12/2015 | He et al. | |
| 9,271,234 B2 | 2/2016 | Ljung | |
| 9,282,480 B2 | 3/2016 | Matsuoka | |
| 9,288,770 B2* | 3/2016 | Loehr | H04W 52/367 |
| 9,307,498 B2* | 4/2016 | Baldemair | H04W 52/365 |
| 9,414,315 B2 | 8/2016 | Damji et al. | |
| 9,521,585 B2* | 12/2016 | Yavuz | H04W 28/06 |
| 9,532,320 B2* | 12/2016 | Feuersaenger | H04W 52/365 |
| 9,555,714 B2 | 1/2017 | Tomura et al. | |
| 9,577,432 B2* | 2/2017 | Li | B60L 1/006 |
| 9,615,338 B2* | 4/2017 | Kim | H04W 52/365 |
| 9,769,769 B2* | 9/2017 | Harper | H04B 7/022 |
| 9,785,174 B2* | 10/2017 | Khawand | H04W 52/281 |
| 9,794,894 B2* | 10/2017 | Feuersaenger | H04W 72/0473 |
| 9,813,494 B2* | 11/2017 | Ding | H04L 67/51 |
| 9,813,997 B2* | 11/2017 | Mercer | H04B 1/3838 |
| 9,871,544 B2* | 1/2018 | Mercer | H04B 1/3838 |
| 9,871,545 B2* | 1/2018 | Khawand | H04B 1/3838 |
| 10,013,038 B2* | 7/2018 | Mercer | H04B 1/3838 |
| 10,044,095 B2* | 8/2018 | Mercer | H01Q 1/24 |
| 10,098,076 B2* | 10/2018 | Kim | H04W 52/365 |
| 10,098,106 B2* | 10/2018 | Kim | H04W 28/04 |
| 10,098,127 B2* | 10/2018 | Kumar | H04W 52/146 |
| 10,122,219 B1 | 11/2018 | Hosseini et al. | |
| 10,149,255 B2* | 12/2018 | Patel | H04W 52/365 |
| 10,158,989 B2* | 12/2018 | Kim | H04W 72/0453 |
| 10,165,527 B2* | 12/2018 | Kim | H04W 52/545 |
| 10,182,453 B2* | 1/2019 | Jeong | H04W 52/0235 |
| 10,224,974 B2* | 3/2019 | Mercer | H04B 17/102 |
| 10,237,877 B1* | 3/2019 | Singh | H04W 52/365 |
| 10,244,489 B2* | 3/2019 | Loehr | H04W 52/365 |
| 10,257,747 B2 | 4/2019 | Kim et al. | |
| 10,257,748 B2 | 4/2019 | Kim et al. | |
| 10,271,292 B2* | 4/2019 | Feuersaenger | H04L 5/001 |
| 10,276,922 B2* | 4/2019 | Mercer | H01Q 1/44 |
| 10,278,207 B2 | 4/2019 | Lee et al. | |
| 10,282,571 B2* | 5/2019 | Sundaram | G06K 7/0095 |
| 10,291,309 B2* | 5/2019 | Chakraborty | H04B 7/0404 |
| 10,327,173 B1 | 6/2019 | Kim et al. | |
| 10,334,560 B2* | 6/2019 | Kim | H04L 5/0082 |
| 10,390,306 B2 | 8/2019 | Ljung | |
| 10,404,793 B2* | 9/2019 | Ding | H04W 4/08 |
| 10,412,629 B2 | 9/2019 | Kim et al. | |
| 10,419,973 B2 | 9/2019 | Kim et al. | |
| 10,420,041 B2* | 9/2019 | Wang | H04W 48/14 |
| 10,448,374 B2* | 10/2019 | Kim et al. | |
| 10,461,406 B2* | 10/2019 | Harper | H01Q 7/005 |
| 10,531,333 B1 | 1/2020 | Kim et al. | |
| 10,587,298 B1* | 3/2020 | Yan | H04W 52/267 |
| 10,631,205 B2 | 4/2020 | Kim et al. | |
| 10,667,176 B2 | 5/2020 | Kim et al. | |
| 10,681,655 B2* | 6/2020 | Loehr | H04W 52/34 |
| 10,764,843 B2* | 9/2020 | Feuersaenger | H04W 72/0473 |
| 10,834,687 B2* | 11/2020 | Hosseini | H04W 72/12 |
| 10,924,145 B2* | 2/2021 | Mercer | H01P 5/18 |
| 10,925,007 B2* | 2/2021 | Sun | H04W 52/146 |
| 11,006,373 B2* | 5/2021 | Han | H04W 52/242 |
| 11,082,951 B2* | 8/2021 | Zhang | H04W 52/367 |
| 11,310,748 B2* | 4/2022 | Sun | H04W 76/10 |
| 11,310,751 B2* | 4/2022 | Liu | H04W 52/365 |
| 11,533,647 B2* | 12/2022 | Wang | H04W 52/0212 |
| 11,570,720 B2* | 1/2023 | Meyuhas | H04W 52/267 |
| 11,711,688 B2* | 7/2023 | Hong | H04W 8/245 |
| | | | 370/329 |
| 11,758,555 B2* | 9/2023 | Ghelichi | H04W 52/0258 |
| | | | 370/329 |
| 11,856,514 B2* | 12/2023 | Xu | H04W 76/27 |
| 11,856,527 B2* | 12/2023 | Bergljung | H04W 52/34 |
| 2004/0160901 A1 | 8/2004 | Raith | |
| 2004/0174833 A1 | 9/2004 | Raith | |
| 2006/0203795 A1* | 9/2006 | Welborn | H04W 52/367 |
| | | | 455/127.1 |
| 2008/0320544 A1 | 12/2008 | Kashalkar et al. | |
| 2009/0268701 A1* | 10/2009 | Welborn | H04W 52/367 |
| | | | 370/336 |
| 2010/0080176 A1* | 4/2010 | Maas | H04L 1/0034 |
| | | | 370/329 |
| 2010/0099449 A1* | 4/2010 | Borran | H04W 52/243 |
| | | | 455/501 |
| 2010/0158147 A1* | 6/2010 | Zhang | H04W 52/242 |
| | | | 455/522 |
| 2010/0167665 A1 | 7/2010 | Zetterman | |
| 2010/0323743 A1* | 12/2010 | Huan | H04W 52/367 |
| | | | 455/522 |
| 2011/0105173 A1 | 5/2011 | Haim et al. | |
| 2011/0136484 A1 | 6/2011 | Braun et al. | |
| 2011/0243002 A1 | 10/2011 | Tsuruoka | |
| 2011/0243016 A1* | 10/2011 | Zhang | H04W 72/04 |
| | | | 370/252 |
| 2012/0008563 A1 | 1/2012 | Johansson et al. | |
| 2012/0142394 A1 | 6/2012 | Huan | |
| 2012/0176923 A1* | 7/2012 | Hsu | H04W 52/367 |
| | | | 370/252 |
| 2012/0178494 A1 | 7/2012 | Haim et al. | |
| 2012/0207112 A1* | 8/2012 | Kim | H04W 52/365 |
| | | | 370/328 |
| 2012/0281568 A1* | 11/2012 | Ho | H04W 52/365 |
| | | | 370/252 |
| 2013/0039173 A1* | 2/2013 | Ehsan | H04W 52/146 |
| | | | 370/229 |
| 2013/0121203 A1 | 5/2013 | Jung et al. | |
| 2013/0215849 A1 | 8/2013 | Heo et al. | |
| 2014/0038588 A1 | 2/2014 | Ljung | |
| 2014/0071904 A1* | 3/2014 | Koo | H04W 72/21 |
| | | | 370/329 |
| 2014/0080459 A1 | 3/2014 | Taha et al. | |
| 2014/0087663 A1* | 3/2014 | Burchill | H04W 52/287 |
| | | | 455/522 |
| 2014/0198736 A1* | 7/2014 | Shukair | H04W 52/146 |
| | | | 370/329 |
| 2014/0219151 A1 | 8/2014 | Damji et al. | |
| 2014/0219223 A1* | 8/2014 | Baldemair | H04W 52/365 |
| | | | 370/329 |
| 2014/0287789 A1 | 9/2014 | Matsuoka | |
| 2014/0321286 A1* | 10/2014 | Yavuz | H04L 1/0007 |
| | | | 370/236 |
| 2014/0330579 A1 | 11/2014 | Cashman et al. | |
| 2015/0011236 A1* | 1/2015 | Kazmi | H04W 52/365 |
| | | | 455/456.1 |
| 2015/0111608 A1* | 4/2015 | Kazmi | H04W 52/367 |
| | | | 455/522 |
| 2015/0124661 A1 | 5/2015 | He et al. | |

(56) References Cited

U.S. PATENT DOCUMENTS

| | | | | |
|---|---|---|---|---|
| 2015/0127733 | A1* | 5/2015 | Ding | H04W 4/70 709/204 |
| 2015/0195795 | A1* | 7/2015 | Loehr | H04W 52/365 455/522 |
| 2015/0282093 | A1 | 10/2015 | Kaukovuori et al. | |
| 2016/0066276 | A1 | 3/2016 | Su et al. | |
| 2016/0081045 | A1 | 3/2016 | Boström et al. | |
| 2016/0129796 | A1 | 5/2016 | Tomura et al. | |
| 2016/0174159 | A1 | 6/2016 | Ljung | |
| 2016/0242128 | A1* | 8/2016 | Loehr | H04W 52/365 |
| 2016/0323887 | A1* | 11/2016 | Patel | H04W 72/0446 |
| 2016/0360462 | A1 | 12/2016 | Chockalingam et al. | |
| 2017/0061168 | A1* | 3/2017 | Sundaram | G06K 7/0095 |
| 2017/0094616 | A1* | 3/2017 | Bagheri | H04W 52/38 |
| 2017/0179771 | A1 | 6/2017 | Leabman | |
| 2017/0367116 | A1 | 12/2017 | Li et al. | |
| 2018/0033087 | A1 | 2/2018 | Delinselle et al. | |
| 2018/0048178 | A1 | 2/2018 | Leabman | |
| 2018/0077640 | A1 | 3/2018 | Wang et al. | |
| 2018/0092071 | A1 | 3/2018 | Dinan et al. | |
| 2018/0123400 | A1 | 5/2018 | Leabman | |
| 2018/0146398 | A1 | 5/2018 | Kim et al. | |
| 2018/0146467 | A1 | 5/2018 | Kim et al. | |
| 2018/0158555 | A1 | 6/2018 | Cashman et al. | |
| 2018/0167848 | A1* | 6/2018 | Lei | H04W 72/0453 |
| 2018/0167897 | A1* | 6/2018 | Sampath | H04W 72/12 |
| 2018/0176293 | A1* | 6/2018 | Ding | H04W 8/005 |
| 2018/0212474 | A1 | 7/2018 | Hosseini et al. | |
| 2018/0241255 | A1 | 8/2018 | Leabman | |
| 2018/0269570 | A1 | 9/2018 | Hosseini et al. | |
| 2018/0287431 | A1 | 10/2018 | Liu et al. | |
| 2018/0293409 | A1* | 10/2018 | Sundaram | H04Q 9/00 |
| 2018/0316748 | A9* | 11/2018 | Ding | H04W 8/005 |
| 2018/0323947 | A1* | 11/2018 | Brunel | H04L 5/1469 |
| 2018/0368079 | A1* | 12/2018 | Wang | H04W 52/241 |
| 2018/0376235 | A1 | 12/2018 | Leabman et al. | |
| 2019/0104477 | A1* | 4/2019 | MolavianJazi | H04W 72/23 |
| 2019/0131827 | A1 | 5/2019 | Johnston et al. | |
| 2019/0149289 | A1 | 5/2019 | Abedini et al. | |
| 2019/0191394 | A1* | 6/2019 | Loehr | H04W 52/365 |
| 2019/0200260 | A1 | 6/2019 | Kim et al. | |
| 2019/0200261 | A1 | 6/2019 | Kim et al. | |
| 2019/0200262 | A1 | 6/2019 | Kim et al. | |
| 2019/0200365 | A1* | 6/2019 | Sampath | H04B 17/318 |
| 2019/0222326 | A1* | 7/2019 | Dunworth | H04B 17/13 |
| 2019/0253976 | A1 | 8/2019 | Pelletier et al. | |
| 2019/0281504 | A1 | 9/2019 | Su et al. | |
| 2019/0281598 | A1 | 9/2019 | Almalfouh et al. | |
| 2019/0364492 | A1* | 11/2019 | Azizi | H04W 52/0264 |
| 2019/0373565 | A1 | 12/2019 | Zeng et al. | |
| 2020/0006988 | A1 | 1/2020 | Leabman | |
| 2020/0008089 | A1 | 1/2020 | Yun et al. | |
| 2020/0008098 | A1 | 1/2020 | Kim et al. | |
| 2020/0021421 | A1* | 1/2020 | Han | H04L 5/14 |
| 2020/0029345 | A1 | 1/2020 | Malik et al. | |
| 2020/0053763 | A1 | 2/2020 | Ljung et al. | |
| 2020/0068438 | A1 | 2/2020 | Kim et al. | |
| 2020/0076462 | A1* | 3/2020 | Yan | H04L 1/1887 |
| 2020/0077301 | A1 | 3/2020 | Kim et al. | |
| 2020/0107296 | A1* | 4/2020 | Zhang | H04W 52/283 |
| 2020/0145080 | A1 | 5/2020 | Tang et al. | |
| 2020/0145927 | A1* | 5/2020 | Sun | H04W 52/146 |
| 2020/0145986 | A1 | 5/2020 | Park et al. | |
| 2020/0280926 | A1* | 9/2020 | Piipponen | H04W 52/16 |
| 2020/0288412 | A1* | 9/2020 | Ajdakple | H04W 52/42 |
| 2020/0383067 | A1* | 12/2020 | Liu | H04L 5/0053 |
| 2020/0411960 | A1* | 12/2020 | Ng | H01Q 21/0025 |
| 2021/0021325 | A1* | 1/2021 | Davydov | H04W 24/10 |
| 2021/0176712 | A1* | 6/2021 | Sun | H04W 72/51 |
| 2021/0204227 | A1* | 7/2021 | Bergljung | H04W 52/38 |
| 2021/0274450 | A1* | 9/2021 | Larsson | H04W 52/365 |
| 2021/0297959 | A1* | 9/2021 | Zhou | H04L 25/0226 |
| 2021/0329602 | A1* | 10/2021 | Zhang | H04W 52/267 |
| 2022/0026973 | A1* | 1/2022 | Eom | G06Q 50/10 |
| 2022/0150921 | A1* | 5/2022 | Mehta | H04W 52/0206 |
| 2022/0210819 | A1* | 6/2022 | Sevindik | H04W 72/1263 |
| 2022/0264481 | A1* | 8/2022 | Caporal Del Barrio | H04W 52/365 |
| 2022/0369237 | A1* | 11/2022 | Cui | H04W 52/146 |
| 2023/0065305 | A1* | 3/2023 | He | H04W 52/367 |
| 2024/0023033 | A1* | 1/2024 | Caporal Del Barrio | H04W 52/146 |

* cited by examiner

| PH | POWER HEADROOM LEVEL |
|---|---|
| 0 | POWER_HEADROOM_0 |
| 1 | POWER_HEADROOM_1 |
| 2 | POWER_HEADROOM_3 |
| 3 | POWER_HEADROOM_4 |
| ⋮ | ⋮ |
| 60 | POWER_HEADROOM_60 |
| 61 | POWER_HEADROOM_61 |
| 62 | POWER_HEADROOM_62 |
| 63 | POWER_HEADROOM_63 |

FIG. 14

| $P_{CMAX,f,c}$ | NOMINAL UE TRANSMIT POWER LEVEL |
|---|---|
| 0 | PCMAX_C_00 |
| 1 | PCMAX_C_01 |
| 2 | PCMAX_C_02 |
| ⋮ | ⋮ |
| 61 | PCMAX_C_61 |
| 62 | PCMAX_C_62 |
| 63 | PCMAX_C_63 |

DYNAMIC POWER REDUCTION REQUESTS FOR WIRELESS COMMUNICATIONS

CROSS-REFERENCE TO RELATED APPLICATIONS

This application is a continuation of U.S. patent application Ser. No. 17/175,294, entitled "Dynamic Power Reduction Requests for Wireless Communications," filed Feb. 12, 2021, which is a continuation of U.S. patent application Ser. No. 16/671,910, entitled "Dynamic Power Reduction Requests for Wireless Communications," filed Nov. 1, 2019, which claims priority to U.S. Provisional Patent Application No. 62/910,849, entitled "Dynamic Power Reduction Requests for Wireless Communications," filed Oct. 4, 2019, and U.S. Provisional Patent Application No. 62/755,199, entitled "Dynamic Power Reduction Requests for Wireless Communications," filed Nov. 2, 2018, each of which this application incorporates in their entirety for all purposes.

BACKGROUND

The present disclosure relates generally to power reduction requests for wireless communications and using user equipment (UE) to dynamically set the power level for communications between the UE and a wirelessly connected node of a wireless network.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The 3$^{rd}$ Generation Partnership Project (3GPP) defines various standards as part of the duties of the collaborative organization. For example, 3GPP has defined a 5G New Radio (NR) Frequency Range 2 (FR2) specification that controls how the UE and a Next Generation NodeB (gNB) communicate and sets power levels for the 5G communications. However, this power level may be inappropriate for at least some periods of operation for the UE.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "one embodiment," "an embodiment," "embodiments," and "some embodiments" of the present disclosure are not intended to be interpreted as excluding the existence of additional embodiments that also incorporate the recited features.

Since conditions may change in and/or around a UE device communicating using a protocol specified in the 3GPP BR FR2, the UE may dynamically reduce transmission power during operation to match a level suitable for the conditions. For instance, the UE may set a reduced peak power level and/or a reduced average power level based at least in part on the conditions. The conditions that may cause the UE to reduce transmission power may include approaching/exceeding a temperature threshold (i.e., overheating) of the UE, approaching/exceeding a regulatory limit on maximum permissive exposure (MPE) when a human body is in proximity to the UE, and/or other suitable conditions. To achieve the reduced power, the UE may notify the gNB to reduce transmission power while attempting to maintain connection in the cell.

Figure 1:
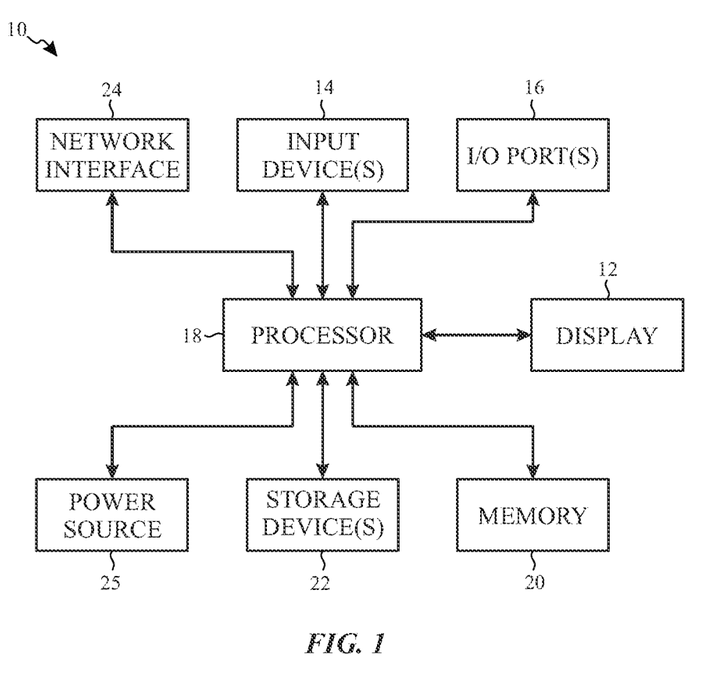
FIG. 1 is a block diagram of an electronic device used to communicate with a base node, in accordance with an embodiment of the present disclosure.

As will be described in more detail below, the electronic device 10 may be any suitable electronic device, such as a computer, a mobile phone, a portable media device, a wearable device, a tablet, a television, a virtual-reality headset, a vehicle dashboard, and the like. Thus, it should be noted that FIG. 1 is merely an example of a particular implementation and is intended to illustrate the types of components that may be present in the electronic device 10.

In the depicted embodiment, the electronic device 10 includes an electronic display 12, one or more input devices 14, one or more input/output (I/O) ports 16, a processor core complex 18 having one or more processor(s) or processor cores, local memory 20, a main memory storage device 22, a network interface 24, and a power source 25. The various components described in FIG. 1 may include hardware elements (e.g., circuitry), software elements (e.g., a tangible, non-transitory computer-readable medium storing instructions), or a combination of both hardware and software elements. It should be noted that, in some embodiments, the various depicted components may be combined into fewer components or separated into additional components. For example, the local memory 20 and the main memory storage device 22 may be included in a single component.

As depicted, the processor core complex 18 is operably coupled to the local memory 20 and the main memory storage device 22. Thus, the processor core complex 18 may execute instructions stored in local memory 20 and/or the main memory storage device 22 to perform operations, such as generating and/or transmitting image data. As such, the processor core complex 18 may include one or more general purpose microprocessors, one or more application specific processors (ASICs), one or more field programmable logic arrays (FPGAs), or any combination thereof. Furthermore, as previously noted, the processor core complex 18 may include one or more separate processing logical cores that each process data according to executable instructions.

In addition to the executable instructions, the local memory 20 and/or the main memory storage device 22 may store the data to be processed by the cores of the processor core complex 18. Thus, in some embodiments, the local memory 20 and/or the main memory storage device 22 may include one or more tangible, non-transitory, computer-readable media. For example, the local memory 20 may include random access memory (RAM) and the main memory storage device 22 may include read only memory (ROM), rewritable non-volatile memory such as flash memory, hard drives, optical discs, and the like.

As depicted, the processor core complex 18 is also operably coupled to the network interface 24. In some embodiments, the network interface 24 may facilitate communicating data with other electronic devices via network connections. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, and/or a wide area network (WAN), such as a 4G or LTE cellular network. In some embodiments, the network interface 24 includes one or more antennas configured to communicate over network(s) connected to the electronic device 10. In some embodiments, the electronic device 10 may utilize dual connectivity in that the electronic device 10 couples to a primary cell (e.g., LTE or 5G) and a secondary cell (e.g., 4G or 5G NR) of a same cellular service provider and uses either the primary or secondary cell to receive data via a serving cell.

Additionally, as depicted, the processor core complex 18 is operably coupled to the power source 25. In some embodiments, the power source 25 may provide electrical power to one or more component in the electronic device 10, such as the processor core complex 18, the electronic display 12, and/or the network interface 24. Thus, the power source 25 may include any suitable source of energy, such as a rechargeable lithium polymer (Li-poly) battery and/or an alternating current (AC) power converter.

Furthermore, as depicted, the processor core complex 18 is operably coupled to the I/O ports 16. In some embodiments, the I/O ports 16 may enable the electronic device 10 to receive input data and/or output data using port connections. For example, a portable storage device may be connected to an I/O port 16 (e.g., universal serial bus (USB)), thereby enabling the processor core complex 18 to communicate data with the portable storage device. In some embodiments, the I/O ports 16 may include one or more speakers that output audio from the electronic device 10.

As depicted, the electronic device 10 is also operably coupled to input devices 14. In some embodiments, the input device 14 may facilitate user interaction with the electronic device 10 by receiving user inputs. For example, the input devices 14 may include one or more buttons, keyboards, mice, trackpads, and/or the like. The input devices 14 may also include one or more microphones that may be used to capture audio. For instance, the captured audio may be used to create voice memorandums. In some embodiments, voice memorandums may include a single-track audio recording.

Additionally, in some embodiments, the input devices 14 may include touch-sensing components in the electronic display 12. In such embodiments, the touch sensing components may receive user inputs by detecting occurrence and/or position of an object touching the surface of the electronic display 12.

In addition to enabling user inputs, the electronic display 12 may include a display panel with one or more display pixels. The electronic display 12 may control light emission from the display pixels to present visual representations of information, such as a graphical user interface (GUI) of an operating system, an application interface, a still image, or video content, by display image frames based at least in part on corresponding image data. For example, the electronic display 12 may be used to display a voice memorandum application interface for a voice memorandum application that may be executed on the electronic device 10. In some embodiments, the electronic display 12 may be a display using liquid crystal display (LCD), a self-emissive display, such as an organic light-emitting diode (OLED) display, or the like.

As depicted, the electronic display 12 is operably coupled to the processor core complex 18. In this manner, the electronic display 12 may display image frames based at least in part on image data generated by the processor core complex 18. Additionally or alternatively, the electronic display 12 may display image frames based at least in part on image data received via the network interface 24 and/or the I/O ports 16.

Figure 2:
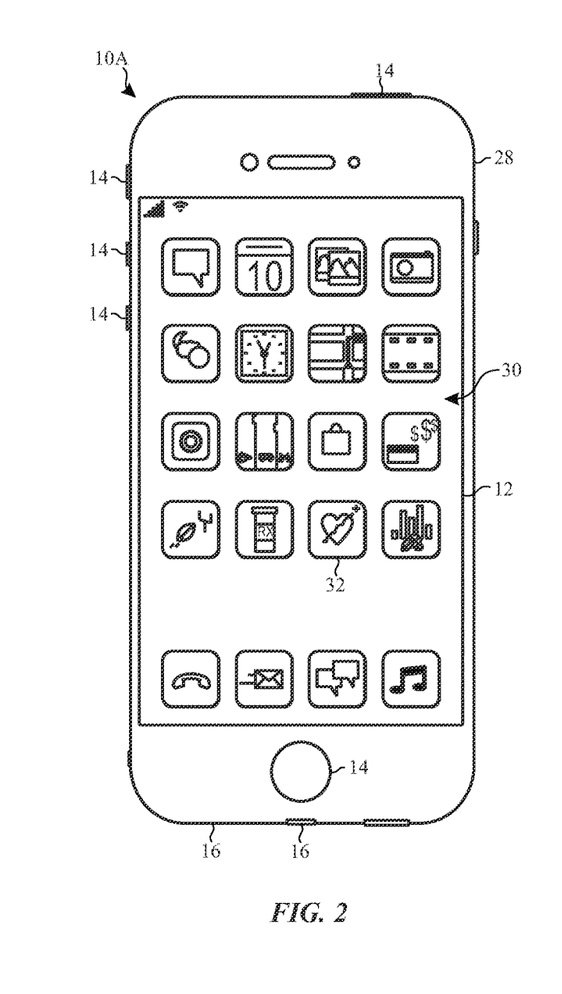
FIG. 2 is one example of the electronic device of FIG. 1, in accordance with an embodiment of the present disclosure.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any IPHONE® model available from Apple Inc.

As depicted, the handheld device 10A includes an enclosure 28 (e.g., housing). The enclosure 28 may protect interior components from physical damage and/or shield them from electromagnetic interference. Additionally, as depicted, the enclosure 28 surrounds at least a portion of the electronic display 12. In the depicted embodiment, the electronic display 12 is displaying a graphical user interface (GUI) 30 having an array of icons 32. By way of example, when an icon 32 is selected either by an input device 14 or a touch-sensing component of the electronic display 12, a corresponding application may launch.

Furthermore, as depicted, input devices 14 may extend through the enclosure 28. As previously described, the input devices 14 may enable a user to interact with the handheld device 10A. For example, the input devices 14 may enable the user to record audio, to activate or deactivate the handheld device 10A, to navigate a user interface to a home screen, to navigate a user interface to a user-configurable application screen, to activate a voice-recognition feature, to provide volume control, and/or to toggle between vibrate and ring modes. As depicted, the I/O ports 16 also extends through the enclosure 28. In some embodiments, the I/O ports 16 may include an audio jack to connect to external devices. As previously noted, the I/O ports 16 may include one or more speakers that output sounds from the handheld device 10A.

Figure 3:
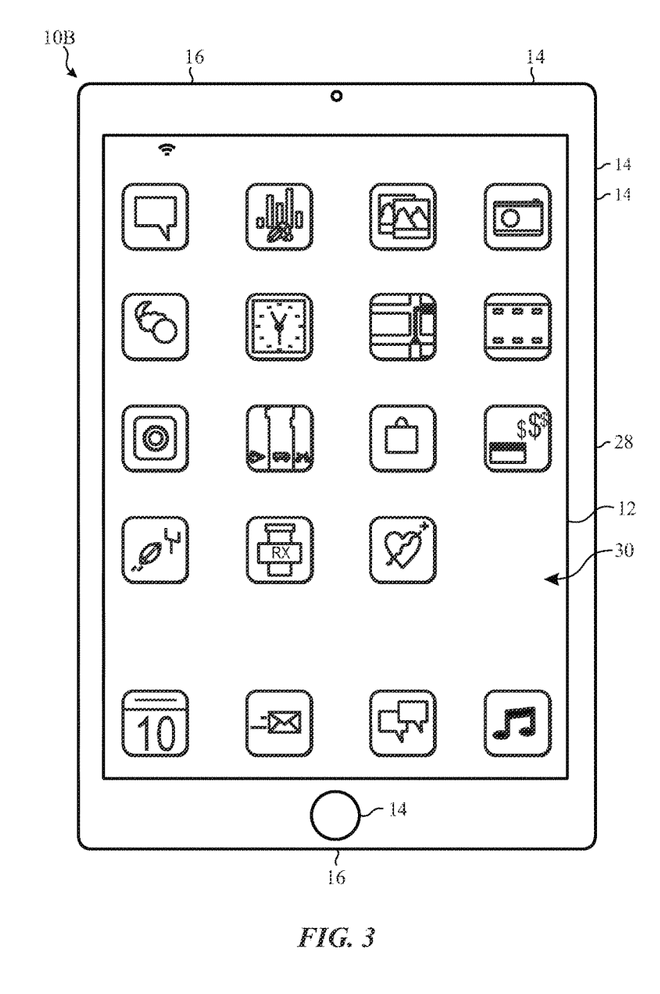
FIG. 3 is another example of the electronic device of FIG. 1, in accordance with an embodiment of the present disclosure.
Figure 4:
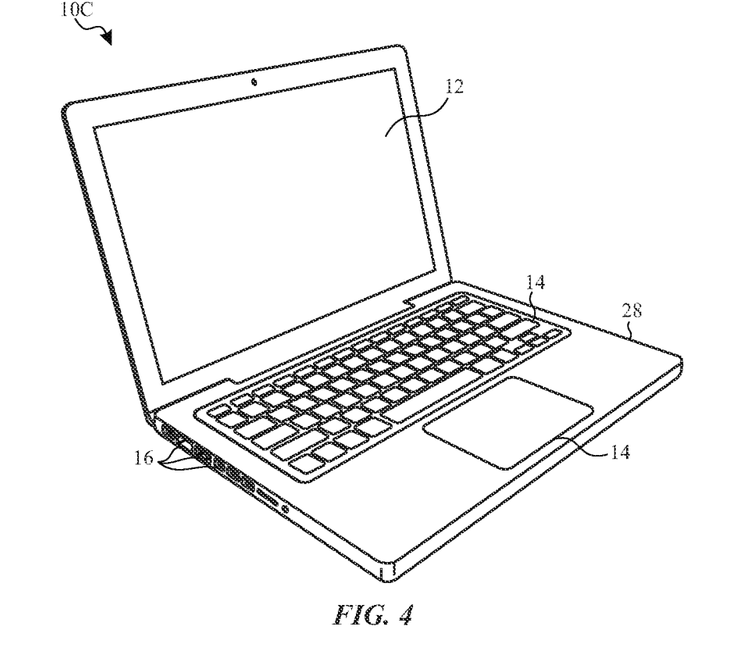
FIG. 4 is another example of the electronic device of FIG. 1, in accordance with an embodiment of the present disclosure.
Figure 5:
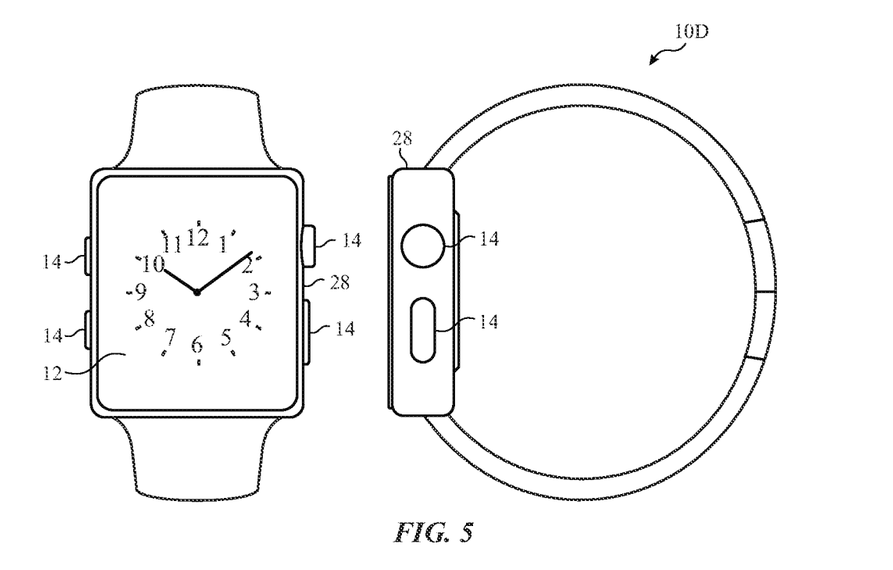
FIG. 5 is another example of the electronic device of FIG. 1, in accordance with an embodiment of the present disclosure.

To further illustrate an example of a suitable electronic device 10, specifically a tablet device 10B, is shown in FIG. 3. For illustrative purposes, the tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a wearable device 10D, is shown in FIG. 5. For illustrative purposes, the wearable device 10D may be any APPLE WATCH® model available from Apple Inc. As depicted, the tablet device 10B, the computer 10C, and the wearable device 10D each also includes an electronic display 12, input devices 14, and an enclosure 28.

Figure 6:
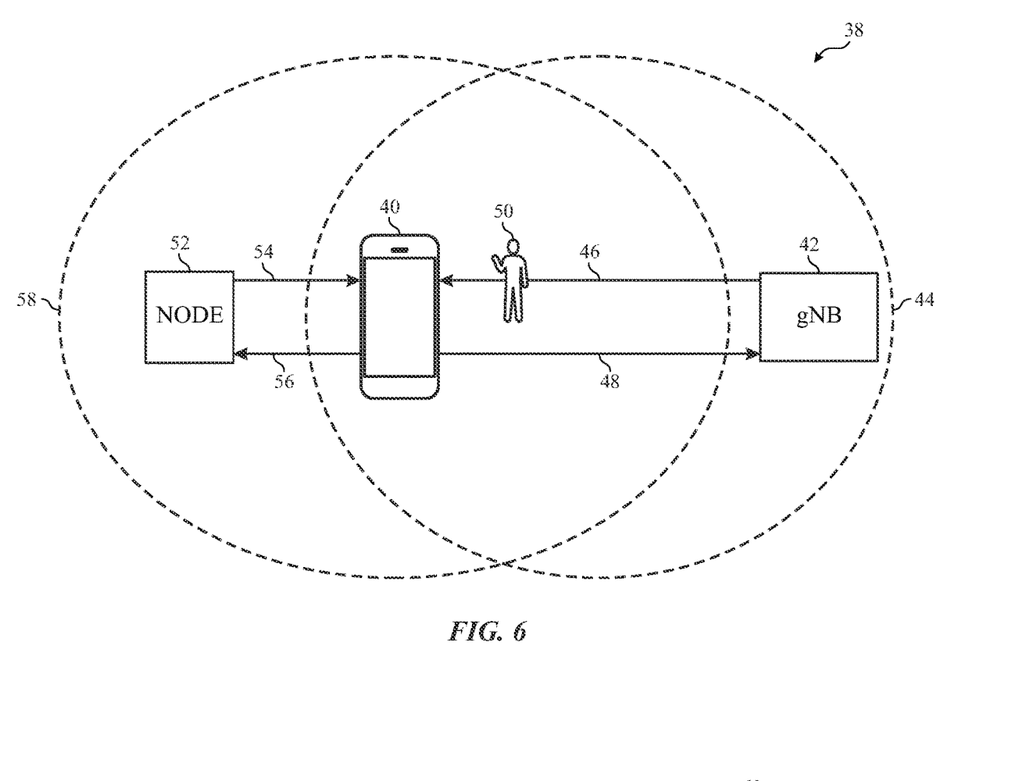
FIG. 6 is a wireless communication cell with a UE connected to a gNB and another node, in accordance with an embodiment of the present disclosure.

FIG. 6 is a graph of a system 38 including a UE 40 coupled to a gNB 42 in a wireless communication cell 44 of a wireless communication network. The UE 40 may be an electronic device, such as the electronic device 10. The gNB 42 sends data to the UE 40 via a downlink 46 while the UE 40 sends data to the gNB 42 via an uplink 48. During some communication between the UE 40 and gNB 42, the downlink 46 or the uplink 48 may be at least partially directed at a person 50. The UE 40 may track exposure of the person 50 to ensure that the person 50 is exposed to less than a maximum permissive exposure (MPE). Specifically, the UE 40 may reduce power used in the communications between the UE 40 and the gNB 42. Furthermore, the UE 40 may reduce power for other reasons, such the UE 40 overheating and/or other reasons where reduced power below a maximum power level may be used. For example, power savings may be applied by the UE 40 at some level below a maximum level upon initiation of a low power mode for the UE 40 due manual selection of the mode and/or based on power available in a battery providing power to the UE 40 being below a threshold.

The UE 40 may connect to more than one cell using different or the same wireless protocols. For example, as illustrated, the UE 40 connects to another node 52 with a downlink 54 and an uplink 56 in a cell 58. The cell 58 and the cell 44 may be provided by a same provider providing different or the same wireless protocols. For instance, the cell 44 may utilize 5G NR while the cell 58 may utilize 5G NR, 5G, 4G, LTE, WiFi, and/or other wireless protocols.

Reduced Power Levels

Figure 7:
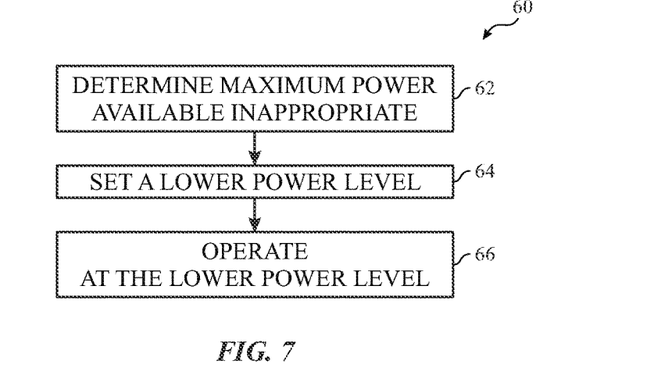
FIG. 7 illustrates a flow diagram of a process for the electronic device setting a reduced power level for communications between the electronic device and the gNB, in accordance with an embodiment of the present disclosure.

With the foregoing in mind, FIG. 7 is flow-diagram of a process 60 that may be used by the UE 40 coupled to a network to cause the UE 40 to restrict transmission power in communication between the UE 40 and the network via the gNB 42. The UE 40 determines that a maximum power availability for the transmission is not appropriate to the current conditions (block 62). For instance, the UE 40 may determine that the maximum power availability may be beyond the capabilities of the UE 40, may cause or may have already caused the UE 40 to overheat, may possibly cause a human body to exceed the MPE due to transmissions between the UE 40 and the gNB 42, and/or other conditions. The UE 40 then sets a lower power level that is lower than the maximum power availability (block 64). For instance, the UE 40 may enable discontinuous transmissions (DTX), set a duty cycle for the transmissions, and/or increase slot aggregation. The UE 40 then operates at the lower power level (block 66).

Event-Based Power Restriction

Figure 8:
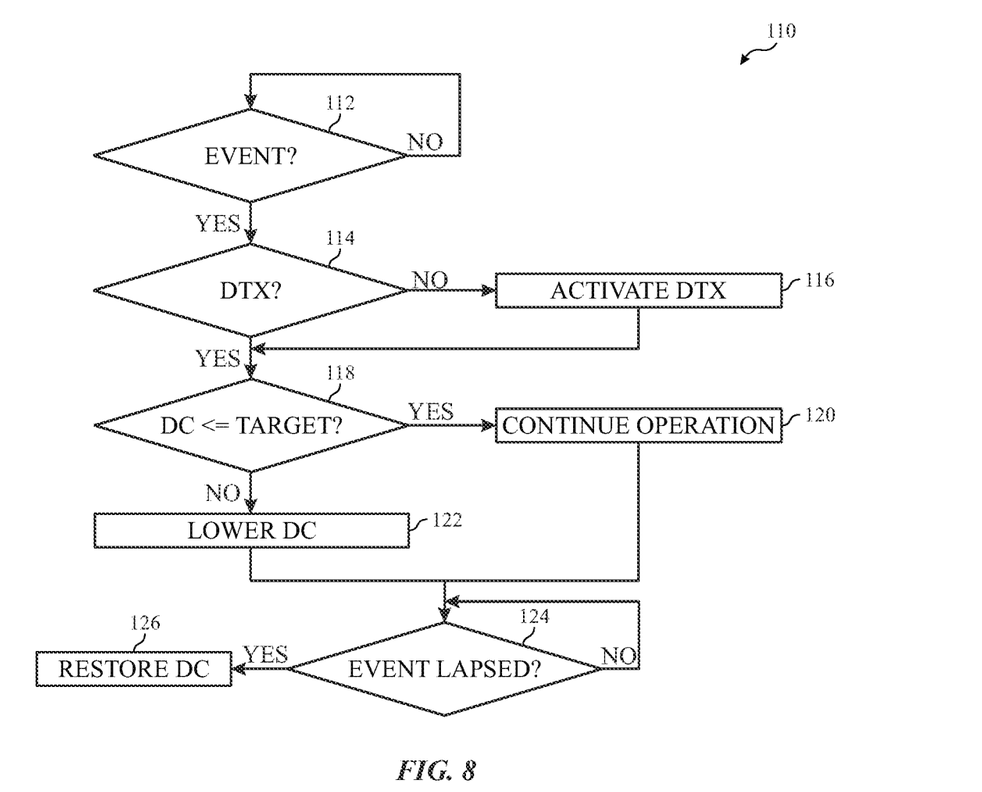
FIG. 8 illustrates a flow diagram of a process for event-based setting of a reduced power level for communications, in accordance with an embodiment of the present disclosure.

During operation, the UE 40 may track one or more conditions, such heat level of the UE 40, available power for the UE 40 from its battery, exposure to transmissions by the person 50, and the like. When an event occurs such that a condition of the one or more conditions exceeds a corresponding threshold, the UE 40 may adjust a power level of a transmission between the UE 40 and the gNB 42. FIG. 8 is a flow-diagram of a process 110 for event-based power restriction. The UE 40 determines whether an event has occurred (block 112). For instance, the event may correspond to the UE 40 overheating, a limit on UE 40 output power restricted due to MPE limits, use of battery power by the UE 40 and an amount of charge of the battery being below a threshold, and/or other situations where transmit power is to be reduced for the UE 40.

Once such an event occurs, the UE 40 determines whether DTX is activated for communications with the gNB 42 (block 114). When DTX is not activated, the UE 40 activates DTX with a desired duty cycle suitable for the event (block 116). For example, the duty cycle may be proportional to underlying properties of the event. For instance, if the UE 40 has/is overheating by a first value, a first duty cycle may be used. However, if the UE 40 has overheated or is overheating by a second and higher value, a second duty cycle that is lower than the first duty cycle may be used. Similarly, detection of a person in a direct path between the UE 40 and gNB 42 may cause the UE 40 to use a lower duty cycle than detection of the person close enough to be partially exposed to the communications.

If DTX is already activated, the UE 40 determines whether a current duty cycle for the DTX is less than or equal to a target duty cycle (block 118). If the current duty cycle is less than or equal to the target duty cycle, the UE 40 continues operation at the current duty cycle (block 120). If the current duty cycle is greater than the target duty cycle, the UE 40 lowers the duty cycle (block 122).

In some embodiments, the UE 40 may continuously track the event or may set a period for reduced power. The UE 40 may determine whether the event or time has lapsed (block 124). Once the time for reduced power has lapsed, the UE 40 restores the duty cycle from before the event (block 126). The restored duty cycle may include a previous duty cycle or may include a 100% duty cycle (e.g., returning to continuous transmissions).

Static Duty Cycle Capability-based Restriction

A capability of the UE 40 is defined in the specification to allow the UE 40 to request a static scheduler restriction on the network to maintain the percentage of allocated UL symbols over a certain evaluation period. For instance, the UE 40 may set a maxUplinkDutyCycle capability with percentage values (e.g., 60, 70, 80, 90, or 100) in the specification. If the maxUplinkDutyCycle capability is not signaled to the gNB 42 (or other node in the network), there is no restriction on UL symbol scheduling. If this capability is signaled, a restriction on UL symbol scheduling is applied according to this capability. If this capability is signaled, and the percentage of UL symbols allocated to the UE 40 exceeds the capability, then the UE 40 calculates and applies a power reduction via a power back-off (e.g., P-MPR) to the gNB 42. This power reduction value may be set at any percentage value (e.g., 10, 20, 30, 40, 50, 60, 70, 80, 90, and 100 percent) of the maximum power.

Event-Triggered Duty Cycle Restriction

The UE 40 may utilize an uplink duty cycle restriction. The uplink duty cycle restriction is defined as a scheduler restriction on the network (via the gNB 42) to maintain a percentage of allocated uplink symbols for the UE 40 over a certain evaluation period. For instance, the values may be 10 percent, 20 percent, 30 percent, 40 percent, 50 percent, 60 percent, 70 percent, 80 percent, 90 percent, or another percent. Furthermore, different uplink duty cycle restrictions may be tied to different levels of the parameter corresponding to the event. For example, different thresholds of overheating of the UE 40 may correspond to different duty cycle restrictions. Similarly, different duty cycle levels may be selected for different thresholds of other event types.

When the event occurs, the UE 40 sends the event-triggered request to the network (via the gNB 42) with additional event reported information. If the event corresponds to the UE 40 overheating, the UE 40 transmits the event trigger to the network with the reported information of a target UL duty cycle and/or power back-off (P-MPR). If the event corresponds to the UE 40 limited due to MPE, the UE 40 transmits the event trigger to the network with the reported information of a target uplink duty cycle and/or a P-MPR to meet MPE limits. Similarly, the UE 40 may send communications for other event types that specific a target uplink duty cycle and/or a P-MPR. The UE 40 may track the event and/or use a timer to set a duration of reduced transmission power. In the case of a timed duration of reduced transmission power, the UE 40 may transmit an indication of the duration to the network and/or may track the duration with a timer and send a notification after the duration of the reduced transmission power has elapsed. In some embodiments, to enable UE implementation flexibility in meeting MPE limits or other transmission power thresholds, the UE 40 may change the event parameters that lead to the triggers, such as select a different uplink duty cycle restriction or remove the duty cycle restriction for certain events and/or levels associated with events.

Event-Triggered Uplink Slot Aggregation

Figure 9:
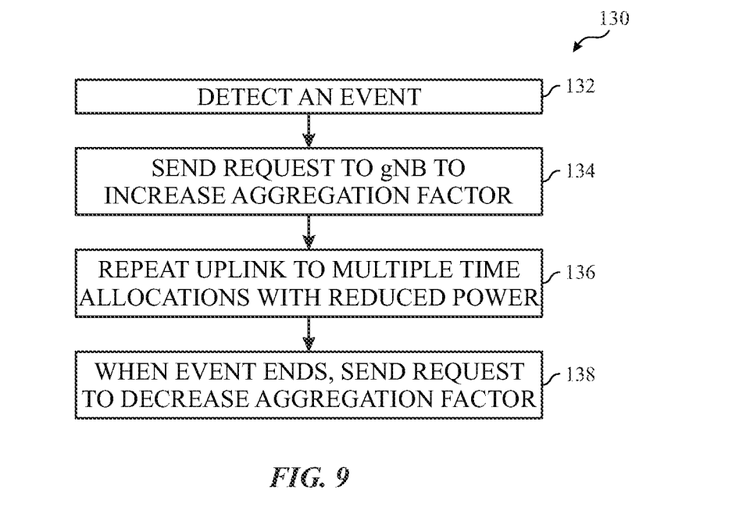
FIG. 9 illustrates a flow diagram of a process for the UE changing an aggregation factor, in accordance with an embodiment of the present disclosure.

In addition to or alternative to duty cycle manipulation, the UE 40 may change an aggregation factor based on the events. FIG. 9 is a flow diagram of a process 130 for the UE 40 changing an aggregation factor. The UE 40 detects an event (block 132). When the event is detected, the UE 40 sends an event-triggered request to the gNB 42 to change an aggregation factor for the transmission (block 134). For instance, the UE 40 may send a desired Physical Uplink Shared Channel (PUSCH)-AggregationFactor for each bandwidth part (BWP) of links between the UE 40 and the gNB 42. In some embodiments, the UE 40 may send an expected duration for the requested change as part of the request.

Subsequently, when the UE 40 is granted with an uplink transmission, the UE 40 repeats the PUSCH in multiple consecutive time allocations with a reduced power (block 136). For instance, the aggregation factor may combine a number of time slots that reduces power consumption to a level approximately inversely proportional to the PUSCH-AggregationFactor. For instance, when the PUSCH-AggregationFactor is doubled (e.g., set to 2 from no aggregation), the power consumption is reduced by half.

When the criteria of such an event is no longer met, the UE 40 may send an event-triggered request to disable UL slot aggregation (block 138). Additionally or alternatively, when the duration of the UL slot aggregation request has passed, the gNB 42 may disable UL slot aggregation (and send a TPC command) without a later request from the UE 40 after the initial aggregation request.

Figure 10:
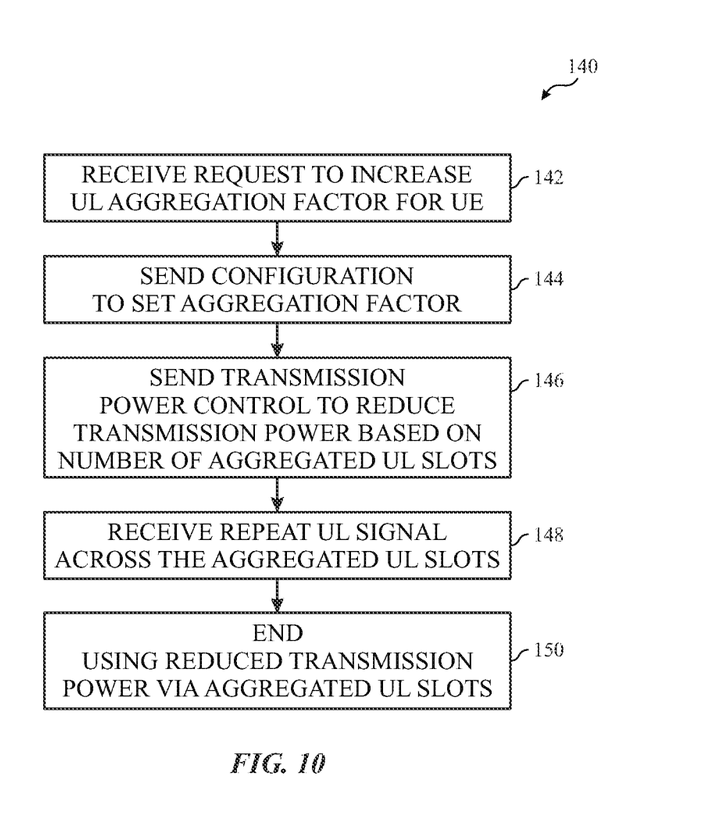
FIG. 10 illustrates a flow diagram of a process for the UE changing an aggregation factor, in accordance with an embodiment of the present disclosure.

FIG. 10 is a flow diagram of a process 140 performed by the gNB 42 and/or other device in the network with a slot aggregation factor change. The gNB 42 receives the request from the UE 40 (block 142). Upon receiving the request, the gNB 42 sends a PUSCH-Config for each active BWP with the PUSCH-AggregationFactor set to the appropriate value (block 144). The gNB 42 may then send transmission power control (TPC) commands to reduce the transmission power according to the number of aggregated uplink slots to maintain a combined signal quality (block 146). The gNB 42 then receives repeated uplink signals across slots (block 148). The gNB 42 may end using the reduced transmission power (block 150). To end the reduced transmission power, the gNB 42 may receive a message from the UE 40 that the period of reduced power has ended due to a change in parameter corresponding to the event or a timer associated with the reduced transmission power elapsing. Additionally or alternatively, the original request from the UE 40 may have an indication of a duration for the reduced transmission power, and the gNB 42 may track the duration of the reduced transmission period to stop using reduced transmission power after the duration has elapsed.

UE Initiates Transmission Power Reduction

As previously discussed, the UE 40 may autonomously reduce its own maximum transmission power. For example, the UE 40 may apply the power back-off (P-MPR) according to MPE safety constraints, temperature of the UE 40, and/or other events. However, transmission power reduction may create issues for communications between the UE 40 and the gNB 42 by impacting UL coverage. Furthermore, since P-MPR is a mechanism driven by and controlled by the UE 40, the network has no explicit indication on the reduced transmission power that may worsen propagation conditions. As discussed below, the UE 40 may send indications of self-reductions to the gNB 42. For instance, a power headroom report (PHR) may include a "P" field that indicates that P-MPR is applied.

Large P-MPRs may degrade the link too much. Indeed, a large P-MPR may cause radio link failure between the UE 40 and the gNB 42 followed by a radio resource control (RRC) re-establishment process.

In addition to or alternative to P-MPR, the UE 40 may invoke a reduced UL duty cycle, as previously discussed. Unlike P-MPR, a reduced duty cycle may prevent a UE 40 from reducing its transmission power because it can continue transmitting at the same level due to the fact that the network does not allocate UL grants in every available period. Even though the reduced duty cycle approach may ensure better UL coverage, the reduced duty cycle may negatively impact the achievable throughput in the UL. Since the maximum UL duty cycle is a static UE capability, the network may not know when a reduced duty cycle may be applied without communication from the UE 40. Accordingly, a most conservative network implementation may always schedule the UE 40 accordingly. Furthermore, even if a UE 40 signals a very conservative maximum UL duty cycle value (e.g. 20% duty cycle), the power adjustment may be insufficient causing the UE 40 to invoke P-MPR for further power reduction.

Bit Repurposing Power Reduction for Slot Aggregation

In a self-reduction by the UE 40, the PHR may be triggered when a PHR-prohibit-timer expires. In the PHR, a large negative power headroom (PH) may be reported and a reduced and targeted maximum allowed transmit power (Pcmax) may be used.

In some cases, the reduced power may be insufficient to maintain the uplink connection without slot aggregation and/or may be insufficient to keep the UE 40 temperature (or other parameters) under a respective threshold value. In such situations, bits in the communications reserved for PH and Pcmax may be repurposed to indicate various parameters to assist the network in reducing power usage for the UE 40. For example, the bits (e.g., 4 bits) may each include a flag. For instance, a first flag may indicate whether the UE 40 is overheating, a second flag may indicate whether an MPE restraint exists, a third flag may indicate whether a request is made to reduce a duty cycle of the communication, and/or a fourth flag may be used to enable uplink slot aggregation. The flagged values may also be followed by other actions. For example, the UE 40 may send the uplink slot aggregation request and/or duty cycle change request as previously discussed.

In some embodiments, the bits may use one or more (e.g., 2) bits to indicate a target level of uplink slot aggregation. For instance, in some embodiments, the bits may indicate a value, n, and the aggregation factor may be $2^n$. Additionally or alternatively, a number of bits may be used to indicate a desired duty cycle, or duty cycle reduction. Additionally or alternatively, the bits may be used to indicate other power reduction parameters.

Communicating an Amount of Power Reduction

The UE 40 monitors the amount of emitted power in an uplink within a moving window of time. If the total emitted power exceeds a threshold, the UE 40 may inform the gNB 42 by sending an RRC message. Accordingly, the UE 40 may request the network to decrease its duty cycle to reduce power of the transmission. In response, the network may allocate fewer resources to the UE 40 for a period of time. In some embodiments, the network may choose a fixed duration for duty cycle restriction based on FCC regulation. Additionally or alternatively, the UE 40 may inform the gNB 42 about an appropriate duration for duty cycle restriction.

As previously noted, the UE 40 initiates the power reduction and may send an indication (e.g., "P" field in the PHR) that the power reduction is greater than a threshold (e.g., 3 dB). However, even with this indication, the network may not be aware of an amount of power reduction without information from the UE 40 indicating an amount of power back-off (e.g., 3 dB or 6 dB). The network may use this information to optimize network-side scheduling.

Figure 11:
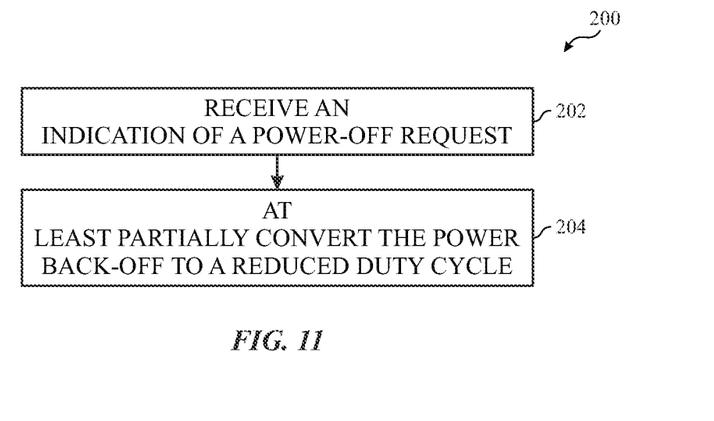
FIG. 11 illustrates a flow diagram of a process that may be used to reduce transmission power for the UE by the gNB, in accordance with an embodiment of the present disclosure.

In some embodiments, the network (e.g., gNB 42) may decide how to achieve a power reduction in response to the request from the UE 40. FIG. 11 illustrates a flow diagram of a process 200 that may be used to reduce transmission power for the UE 40 by the gNB 42. The gNB 42 receives the request from the UE 40 to reduce transmission power via a P-MPR (block 202). Instead of applying a reduced transmission power by reducing transmission levels, the network (e.g., the gNB 42) may at least partially convert the reduction to a duty cycle reduction (block 204). For instance, if the indicated power back-off is a percentage reduction (e.g., 3 dB), the network may cause communications with the UE 40 to be reduced by a percentage (e.g., 75% duty cycle). Furthermore, the network may apply a duty cycle and/or a power level transmission reduction. For instance, if a higher power factor change (e.g., 6 dB) is indicated, the network may reduce the duty cycle while power of the peak transmission power during the duty cycle is also reduced.

Radio Resource Control (RRC) Signaling

The UE 40 may utilize RRC signaling to provide assistance information to aid the network in scheduling communications with the gNB 42. In some embodiments, the UE 40 may repurpose an RRC message or create new RRC messages, RRCAssistanceInformation or UEAssistanceInformation, to include new information elements (IE) to inform the network about various issues, such as an overheating problem at UE 40, MPE issues, and the like. The RRC message may indicate a delay budget and RRC configuration for various scenarios (e.g., overheating, MPE, etc.) and/or may indicate a target UL duty cycle.

Figure 12:
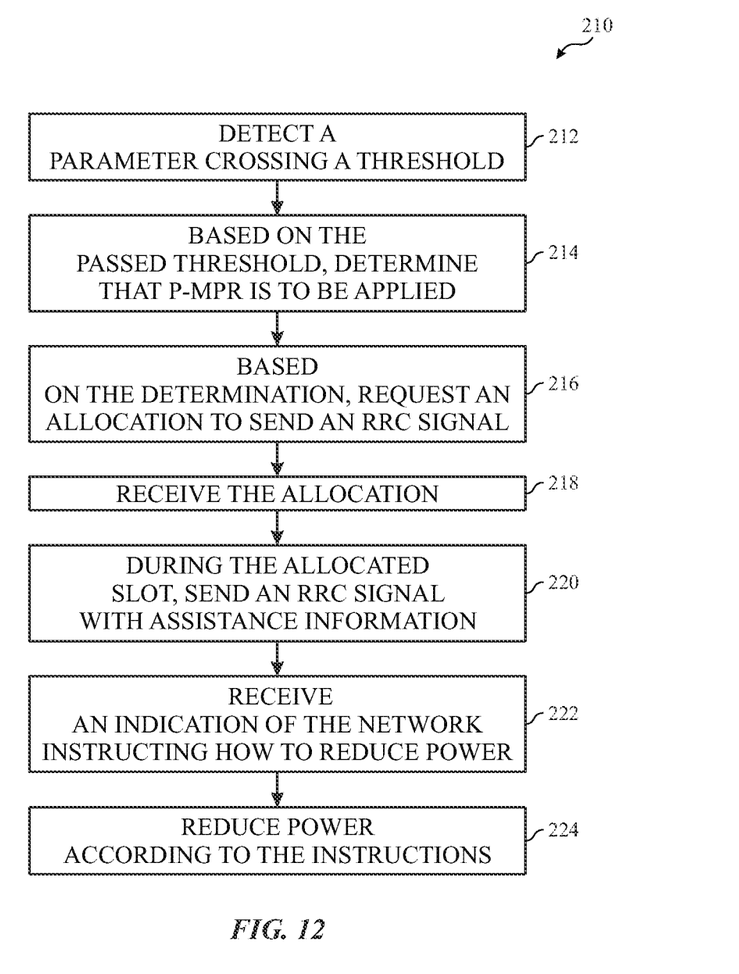
FIG. 12 illustrates a flow diagram of a process used by the UE to signal a duty cycle change using RRC messages, in accordance with an embodiment of the present disclosure.

FIG. 12 is a flow diagram of a process 210 used by the UE 40 to signal a duty cycle change using RRC messages. The UE 40 detects a parameter crossing a threshold (block 212). As previously discussed, the parameter may be related to MPE, overheating, available power, battery usage, and/or other aspects of operation of the UE 40. Based at least in part on the passed threshold, the UE 40 determines that P-MPR is to be applied (block 214). The UE 40 then requests an allocation to send the RRC signal to the gNB 42 (block 216).

Since performing RRC communications uses network resources, the UE may have a timer that controls how frequently the request may be sent or the RRC exchange may be used. If the timer has expired, the UE 40 may re-send the request. Otherwise, the UE 40 may suppress sending the request to initiate the RRC exchange until the timer elapses.

The UE 40 receives the allocation (block 218) and sends the RRC message to the gNB 42 during the allocation (block 220). As previously noted, the RRC message includes assistance information detailing information about the parameter, the duty cycle, and/or the P-MPR. The RRC message may include other information, such as device capability changes and the like. The network makes a decision on how to perform the power reduction. For instance, as previously discussed, the network may decide that a duty cycle is to be used to reduce transmission power rather than decreasing transmission power levels for the UE 40 to prevent degrading UL coverage. Alternatively, the network may choose to decrease the transmission power by reducing transmission levels to prevent a loss in UL throughput. The UE 40 receives an indication from the network instructing how to implement the power reduction from the gNB 42 (block 222) and reduces power according to the indication (block 224).

The additions of the new IEs for the parameters may be added easily regardless of size or structure of the assistance data. Indeed, all of the IEs may be encoded in single specification for simplicity. However, since the RRC exchange involves waiting on an allocation of network resources, the RRC-message-based communication of assistance information to the network may be susceptible to delays especially in heavily loaded networks. In time sensitive-settings, an alternative solution for communicating the assistance information may be utilized: 1) extending a power headroom report (PHR) MAC control element (CE) to include the assistance information or 2) adding a new PHR MAC CE to include the assistance information.

A Single-Entry PHR MAC CE

An existing PHR MAC CE may be enhanced to include the assistance information (e.g., MPE assistance information) in a single entry in addition to the "P" field. Since the network may utilize an existing PHR MAC CE, the addition of the assistance information may be selectively enabled by the network to ensure that the potential inclusion of the assistance information would not interfere with legacy PHR MAC CE operations. Furthermore, the actual presence of the assistance information may be linked to the existing "P" field of the PHR such that the assistance information is added anytime P-MPR is invoked.

Figure 13:
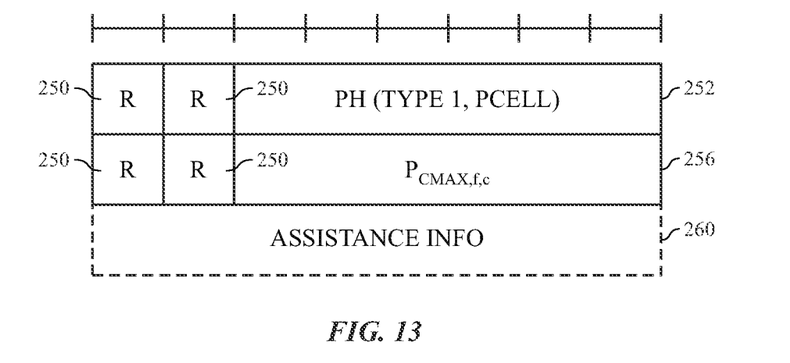
FIG. 13 illustrates a single-entry power headroom report (PHR) MAC control element (CE) used in transmission power reduction by the UE, in accordance with an embodiment of the present disclosure.
Figure 14:
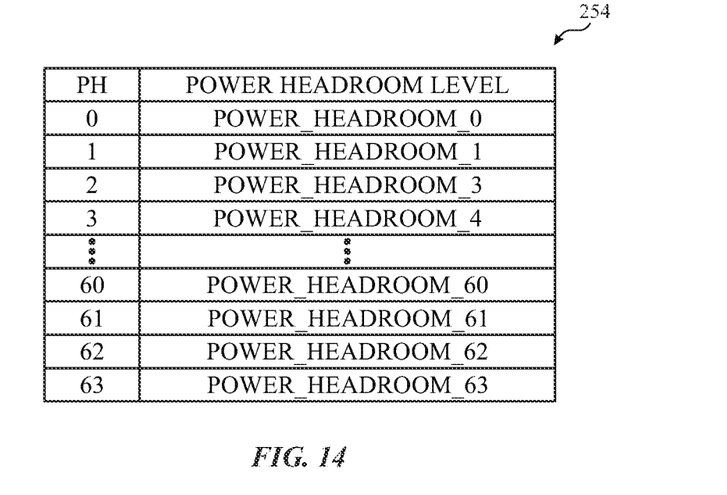
FIG. 14 illustrates a lookup table that may be used for the PHR MAC CE of FIG. 13 to determine a power headroom, in accordance with an embodiment of the present disclosure.

The single-entry PHR MAC CE may be identified by a MAC subheader using a language code identifier (LCID). The single-entry PHR MAC CE may have a fixed or dynamic size. For example, FIG. 13 illustrates a three-octet fixed length for the single-entry PHR MAC CE. Alterative embodiments may include any other suitable length for the single-entry PHR MAC CE. As illustrated, the single-entry PHR MAC CE may include reserved bits 250 that may be set to known values (e.g., 0) and/or reserved for use in other applications. The single-entry PHR MAC CE includes a power headroom (PH) field 252. The PH field 252 indicates the power headroom level for the UE 40. The length of the field may be any suitable length (e.g., 6 bits). The reported PH in the PH field 252 may be used to determine the corresponding power headroom levels by using a lookup table that is indexed using the bits in the PH field 252, such as lookup table 254 in FIG. 14. In the illustrated lookup table 254, the length of the PH field 252 is 6 bits enabling the PH field 252 to specify 64 different PH levels. Different numbers of bits in the PH field 252 may enable specifying a different number of PH levels.

Figure 15:
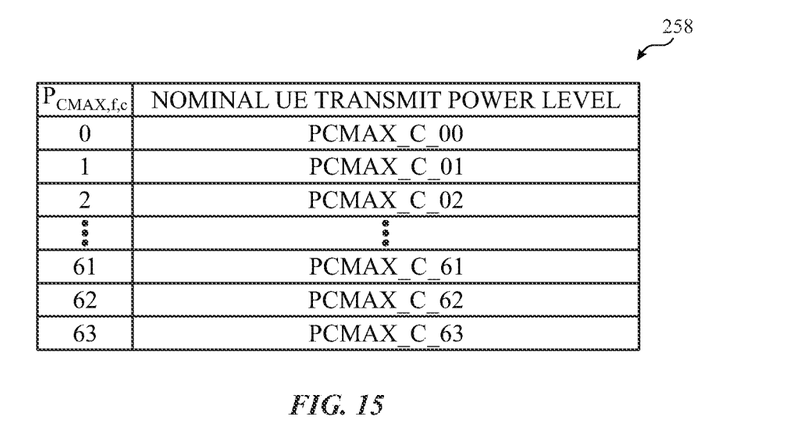
FIG. 15 illustrates a lookup table that may be used for the PHR MAC CE of FIG. 13 to determine a maximum output power, in accordance with an embodiment of the present disclosure.

Returning to FIG. 13, the single-entry PHR MAC CE also may include a $P_{CMAX,f,c}$ field 256. The $P_{CMAX,f,c}$ field 256 indicates the maximum output power ($P_{CMAX,f,c}$) for a carrier of a serving cell (e.g., a primary cell (Pcell) or secondary cell (Scell)) for the UE 40. The $P_{CMAX,f,c}$ used for calculation of the preceding PH field 252. Each possible reported $P_{CMAX,f,c}$ value may correspond to a respective nominal UE 40 transmit power level. FIG. 15 shows a table 258 illustrating an example relationship between the $P_{CMAX,f,c}$ values and the respective nominal transmit power levels. The corresponding measured values of the table 258 may be measured in dBs and specified in a specification for the physical layer procedures for control in 5G NR.

Returning to FIG. 13, the single-entry PHR MAC CE includes an optional assistance information field 260 that may be utilized based on network configuration. If present, assistance information field 260 indicates actual power back-off applied by the UE due to MPE, overheating, power availability, battery usage, and/or other parameters. As illustrated, the assistance information field 260 is an octet of data that may be used to encode an actual power back-off value.

In some embodiments, the assistance information field 260 may be omitted with the PHR MAC CE instead utilizing two or more of the reserved bits 250 to indicate one of an enumerated list of possible values the power back-off. The meaning of these values may vary depending on a set power factor change in the PHR configuration. In other words, a power factor change may be set in the PHR configuration that controls which lookup table is used to convert the values in the assistance information field 260 into an actual power reduction. Thus, the power reduction is based on the set power factor change and the value in the assistance information field 260. For example, the power factor change may be selected as a reduction of dB3 from an enumerated list of reductions by dB1, dB3, or dB6. A LUT corresponding to dB3 is used to determine an amount of back-off based on the value in the assistance information field 260. For example, if the assistance information field 260 uses two of the reserved bits 250 for the LUT, the value in the assistance information field 260 may be used to select one of four available back-offs of the transmission power as transmission level reductions and/or duty cycle reductions.

By utilizing an existing PHR MAC CE, the existing framework for PHR may be changed by a little to deliver messages faster than may be delivered via the RRC-based framework. However, extending the PHR MAC CE is more complicated that adding the new IEs used in the RRC-based framework. The PHR MAC CE is also limited (e.g., 8 bits) in the amount of information that may be transferred via the MAC CE.

Multiple-Entry PHR MAC CE

Figure 16:
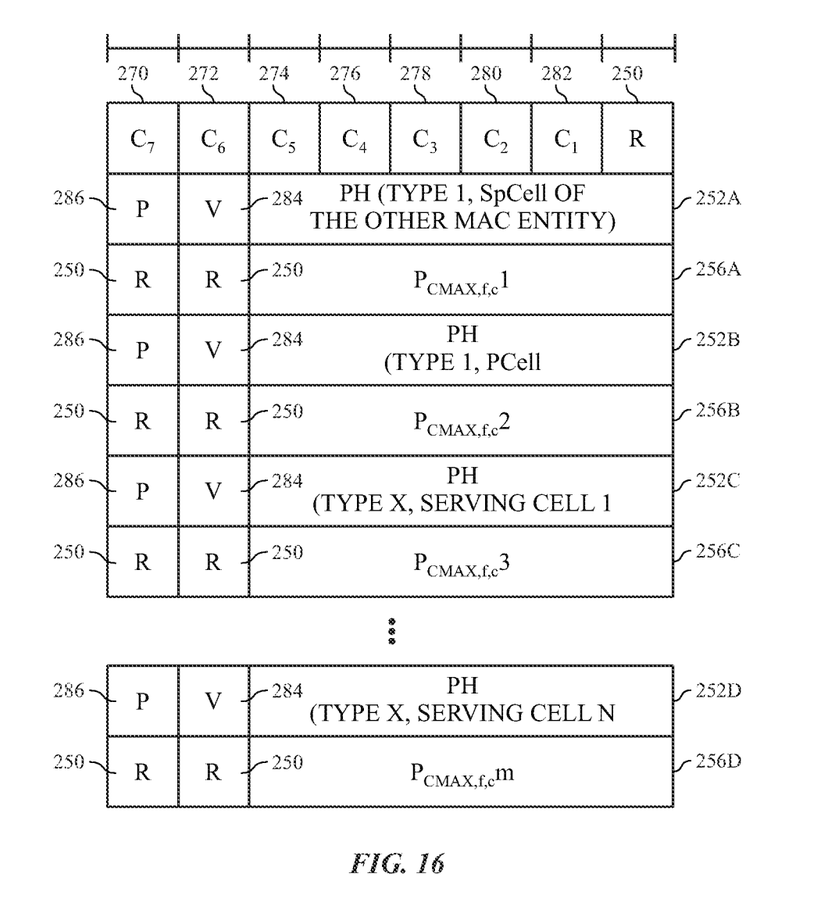
FIG. 16 illustrates a multiple-entry power headroom report (PHR) MAC control element (CE) used in transmission power reduction by the UE, in accordance with an embodiment of the present disclosure.

Instead of using an existing PHR MAC CE, a new PHR MAC CE may be introduced. In the new PHR MAC CE, the P-MPR assistance information may be included. Due to the octet alignment of existing MAC CE elements, the new PHR MAC CE may include an 8-bit field for the assistance information field 260. With the introduction of a new PHR MAC CE, the new PHR MAC CE may be independent from an existing PHR MAC CE to which the new PHR MAC CE is not linked.

As illustrated in FIG. 16, the new PHR MAC CE may have a variable size. The new PHR MAC CE includes PH fields 252 and $P_{CMAX,f,c}$ fields 256 for a special cell, the Pcell, and one or more serving cells. The special cell refers to the Pcell of a master cell group or a primary secondary cell of a secondary cell group. The new PHR MAC CE also includes cell index flags 270, 272, 274, 276, 278, 280, and 282 that each indicates whether a corresponding PH field 252 and $P_{CMAX,f,c}$ field 256 is included in the PHR MAC CE for serving cells. For instance, $C_1$ flag 282 set to a first value (e.g., 1) indicates that the PH field 252C is reported while the $C_1$ flag 282 set to a second value (e.g., 0) indicates that the PH field 252C is not reported in the PHR MAC CE. Similarly, the remaining serving cells each have their own flags and may be similarly signaled. Although the illustrated embodiment of the new PHR MAC CE includes a single octet bitmap to indicate the presence of PH fields 252 for the serving cells using the flags, additional octets (e.g., total 4 octets) when more than 8 uplinks are configured for the UE 40.

The PH field 252A for the special cell is Type 2 PH field that may be configured separately than Type 1 PH fields (e.g., PH field 252B). The serving cells correspond to Type X PH fields that may be Type 1 PH fields or a separately configured Type 3.

The MAC entity determines whether the PH value for an activated Serving Cell is based on real transmission or a reference format by considering the configured grant(s) and downlink control information. The downlink information is received until and including when the physical downlink control channel (PDCCH) first UL grant for a new transmission that can accommodate the MAC CE for PHR is received. The first UL grant causes a PHR to be triggered if the PHR MAC CE is reported on the UL grant received on the PDCCH. Additionally or alternatively, the downlink information may be received until the first UL symbol of a physical uplink shared channel (PUSCH) transmission minus PUSCH preparation time if the PHR MAC CE is reported on already configured grant.

For a band combination in which the UE 40 does not support dynamic power sharing, the UE 40 may omit the octets containing the PH field 252 and $P_{CMAX,f,c}$ field 256 for Serving Cells in other MAC entities except for the PCell in the other MAC entity. The reported values of PH and $P_{CMAX,f,c}$ for the PCell are up to implementations of the UE 40.

As illustrated in FIG. 16, the new PHR MAC CE includes reserved bits 250 that may be used to transmit the assistance information for each cell. Alternatively, separate assistance information fields 260 in a different octet may be used transmit the assistance information. Similarly, the PHR MAC CE may include a pair of the PH field 252 and the $P_{CMAX,f,c}$ field 256 for each cell.

The new PHR MAC CE may also include a V field 284 that indicates whether the PH value is based on a real transmission or a reference format. For Type 1 PH fields (e.g., PH field 252B), the V field 284 is set to a first value (e.g., 0) that indicates that the value is based on a real transmission on PUSCH, and the V field 284 set to a second value (e.g., 1) indicates that the PUSCH reference format is used. For Type 2 PH fields, the V field 284 set to the first value (e.g., 0) indicates real transmission on a physical uplink control channel (PUCCH), and the V field 284 set to the second value (e.g., 1) indicates that a PUCCH reference format is used. For Type 3 PH, the V field 284 set to the first value (e.g., 0) indicates real transmission on sounding reference signals (SRS), and the V field 284 set to 1 indicates that an SRS reference format is used. Furthermore, for Type 1, Type 2, and Type 3 PHs, the V field 284 set to the first value (e.g., 0) indicates the presence of the octet containing the associated $P_{CMAX,f,c}$ field 256, and the V field 284 set to the second value (e.g., 1) indicates that the octet containing the associated $P_{CMAX,f,c}$ field 256 is omitted.

The new PHR MAC CE may also include a P field 286 that indicates whether the MAC entity applies power back-off due to power management (as allowed by P-MPR$_c$). The MAC entity sets the P field 286 to a first value (e.g., 1) if the corresponding $P_{CMAX,f,c}$ field 256 would have had a different value if no power back-off due to power management had been applied.

As may be appreciated, the RRC-based architecture may be deployed in some networks due to the simplicity of deployment relative to the PHR MAC CE while either of the PHR MAC CE-based schemes may be used in architectures where timeliness is preferred over simplicity of deployment.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A cellular network node, comprising:
processing circuitry; and
communication circuitry coupled to the processing circuitry and configured to
receive a request from a user equipment electronic device (UE) to perform a power reduction for communications between the cellular network node and the UE, the request comprising instructions for how to perform the power reduction to implement a power back-off (P-MPR) for the communications between the cellular network node and the UE, and
communicate at a reduced power level for the communications between the cellular network node and the UE based on a schedule of the cellular network node, the processing circuitry of the cellular network node configured to determine the schedule based at least in part on the request.

2. The cellular network node of claim 1, comprising a Next Generation NodeB (gNB).

3. The cellular network node of claim 1, wherein the UE is configured to determine how to perform the power reduction by determining a reduced duty cycle for the communications between the cellular network node and the UE, and the request includes an indication of how to perform the power reduction by indicating the reduced duty cycle.

4. The cellular network node of claim 3, wherein the request comprises a definition of a duration for the reduced duty cycle.

5. The cellular network node of claim 1, wherein the UE is configured to determine how to perform the power reduction by determining a reduction in transmission power for the communications between the cellular network node and the UE, and the request includes an indication of how to perform the power reduction by indicating the reduction in transmission power.

6. The cellular network node of claim 1, wherein the UE is configured to determine that a maximum power availability for the communications between the cellular network node and the UE is not appropriate to current conditions, and the request is based at least in part on this determination.

7. The cellular network node of claim 6, wherein the UE is configured to determine that the maximum power availability is inappropriate by determining whether an event occurs during the communications between the cellular network node and the UE.

8. The cellular network node of claim 7, wherein the event comprises the UE overheating, and the request includes an indication of how to perform the power reduction based at least in part on the UE overheating.

9. The cellular network node of claim 7, wherein the event comprises that a human body has entered into proximity of the UE in a communication path between the UE and the cellular network node, and the human body is likely to be exposed to wireless signals above a maximum permissive exposure (MPE) limit unless the reduced power level is used, and the request includes an indication of the reduced power level.

10. The cellular network node of claim 1, wherein the cellular network node is configured to determine how to implement the power reduction by determining a reduction in transmission power and a reduction in duty cycle for the communications between the cellular network node and the UE, and the request includes an indication of how to perform the power reduction by indicating the reduction in duty cycle and the reduction in transmission power.

11. A method, comprising:
- determining, using a user equipment electronic device (UE), a power back-off (P-MPR) for communications between the UE and a cellular network node;
- reporting, from the UE to the cellular network node, factors associated with the power back-off (P-MPR) for the communications between the UE and the cellular network node;
- determining, by the cellular network node, how to reduce a power level based on a schedule for the cellular network node and the factors reported to the cellular network node;
- sending an indication of a reduced power level to the UE from the cellular network node; and
- communicating, using the cellular network node, with the UE at the reduced power level.

12. The method of claim 11, wherein reducing the power level comprises reducing a transmission power for the communications between the UE and the cellular network node.

13. The method of claim 11, wherein reducing the power level comprises reducing a duty cycle of the communications between the UE and the cellular network node.

14. The method of claim 11, wherein reducing the power level comprises reducing a duty cycle of the communications between the UE and the cellular network node and reducing a transmission power for the communications between the UE and the cellular network node.

15. The method of claim 11, comprising monitoring, using the UE, the power level of the communications between the UE and the cellular network node.

16. The method of claim 15, comprising determining, using the UE, the factors based on the monitoring of the power level of the communications between the UE and the cellular network node.

17. The method of claim 16, wherein the factors associated with the power back-off (P-MPR) comprise the power level exceeding a threshold power level.

18. The method of claim 11, wherein the factors comprise information about a duty cycle of the communications between the UE and the cellular network node.

19. The method of claim 11, wherein the factors comprise device capability changes of the UE.

20. Tangible, non-transitory, and computer-readable medium having stored thereon instructions, that when executed by a processor of a cellular network node, are configured to cause the processor to:
- receive a request from a user equipment electronic device (UE) to perform a power reduction for communications between the cellular network node and the UE;
- determine how to implement the power reduction for the communications between the cellular network node and the UE based at least in part on a schedule for a cellular network of the cellular network node;
- send an indication of a reduced power level from the power reduction to the UE from the cellular network node; and
- communicate at the reduced power level for the communications between the cellular network node and the UE.

* * * * *